Patented June 4, 1929.

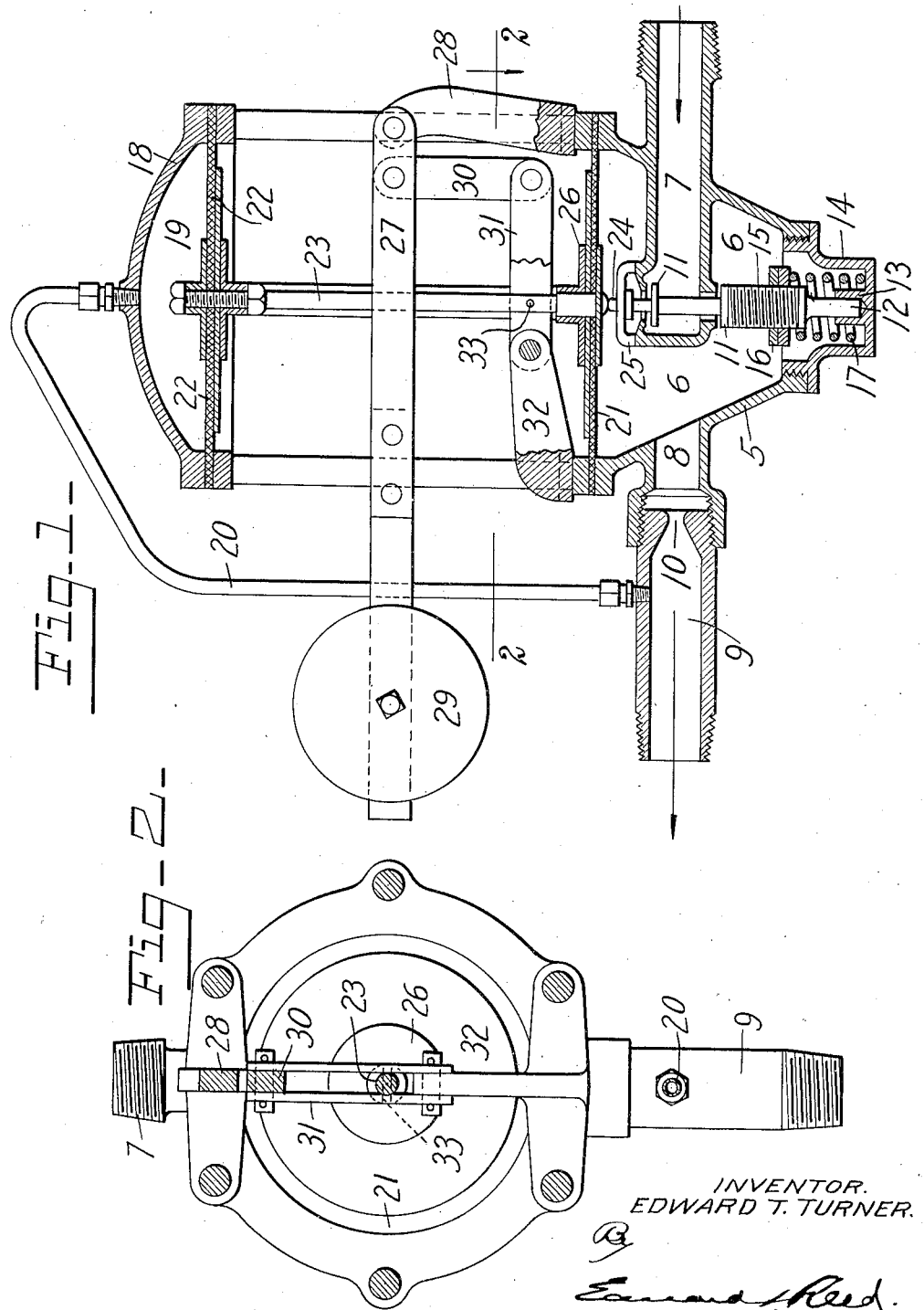

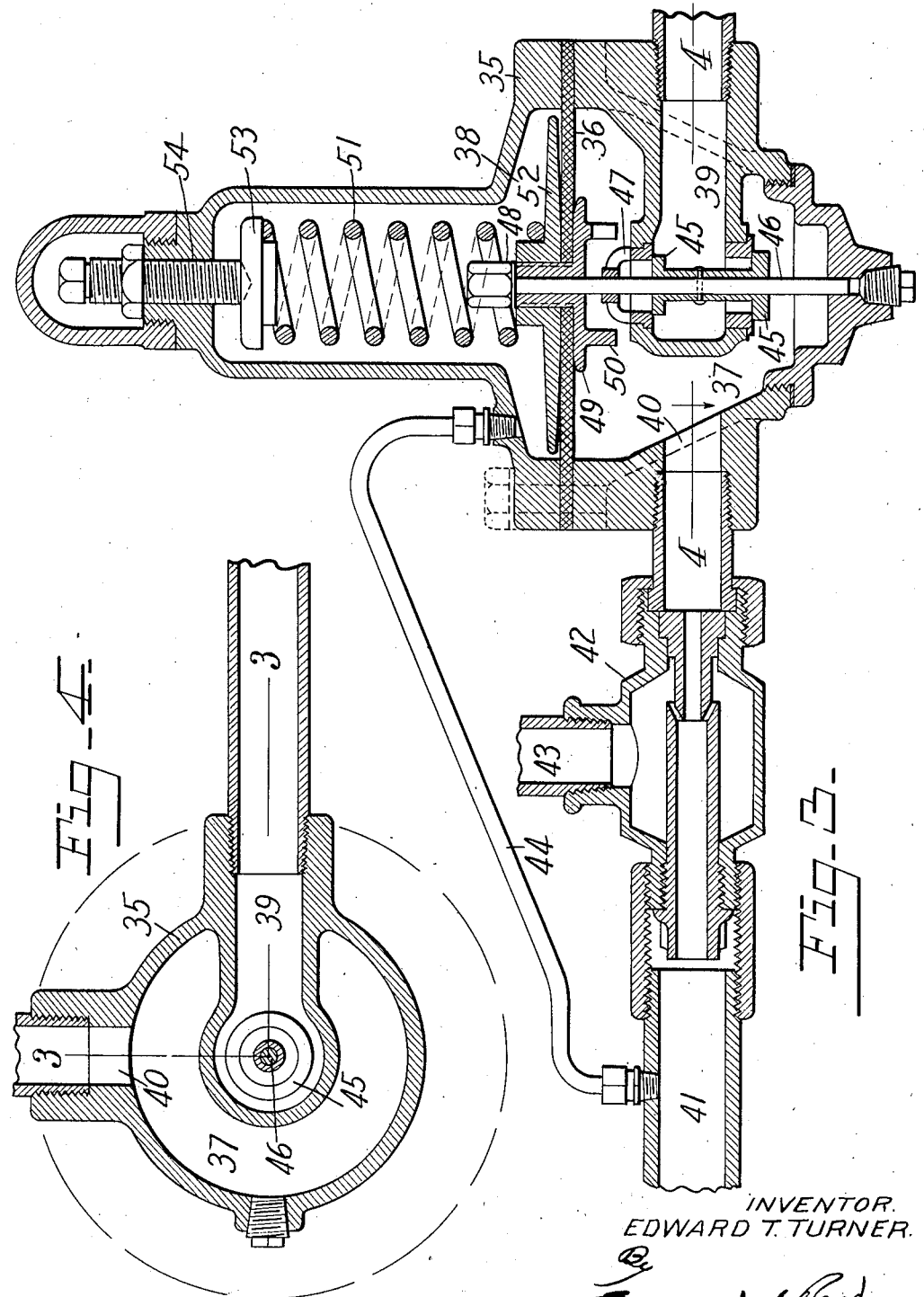

1,715,801

UNITED STATES PATENT OFFICE.

EDWARD T. TURNER, OF DAYTON, OHIO.

FLOW-REGULATING DEVICE FOR FLUIDS.

Application filed January 3, 1927. Serial No. 158,714.

This invention relates to flow regulating devices for fluids and is in part a division of the application for patent filed by me February 25, 1925, Serial No. 11,435.

One object of the invention is to provide a device which will maintain a substantially constant rate of flow of fluid through a conduit regardless of fluctuations of pressure.

A further object of the invention is to provide such a device which will be simple in its construction and wholly automatic in its operation.

Other objects of the invention will appear as the device is described in detail.

In the accompanying drawings Fig. 1 is a sectional view taken vertically through a device embodying my invention; Fig. 2 is a transverse section taken on the line 2—2 of Fig. 1, looking in the direction of the arrows; Fig. 3 is a sectional view of another embodiment of the invention taken on the line 3—3 of Fig. 4; and Fig. 4 is a transverse section taken on the line 4—4 of Fig. 3.

In these drawings I have illustrated two embodiments of my invention both of which are designed primarily for use in connection with a water softening apparatus, such as that shown in the above mentioned application. In such a water softening apparatus the regenerating solution or brine is carried into the water softener by the water entering the latter through the supply line and in order that a proper amount of regenerating solution may be delivered to the softener it is desirable that the flow of water through the supply line shall be confined between certain maximum and minimum limits. It will be understood, however, that the device may be used in connection with apparatus of various kinds and that it may take various forms without departing from the spirit of the invention.

In the two forms of the invention here shown, the apparatus comprises a structure having two chambers. One of these chambers has an inlet to be connected with a supply line or other source of supply for water or other fluid under pressure. This chamber is also provided with an outlet which is adapted to be connected with a conduit through which the fluid is discharged. This conduit has a restricted orifice and is connected at a point beyond this orifice with the other chamber. The inlet of the first mentioned chamber is controlled by a valve and a yieldable device acting upon this valve tends to move the same toward its open position. Interposed between the two chambers and operatively connected with the valve is a movable device which is subjected to the fluid pressures within both chambers, the pressure in the first mentioned chamber opposing the yieldable device and tending to close the valve and the pressure in the last mentioned chamber cooperating with the yieldable device to move the valve toward its open position. As a result the positioning of the valve is controlled by the relative pressures of the fluid on the two sides of the restricted orifice and by a proper adjustment of the yieldable device which acts upon the valve the desired flow of fluid may be established and will then be maintained automatically by said pressures.

In that particular form of the apparatus shown in Figs. 1 and 2 the device comprises a structure consisting of a lower casing 5 having formed therein a chamber 6. Leading into this chamber is an inlet 7 adapted to be connected with a source of supply for fluid under pressure, such as the outer portion of a supply pipe. The chamber 6 also has an outlet 8 with which is connected a conduit 9, which may comprise the inner portion of a supply pipe. This conduit is provided with a restricted orifice, as shown at 10, which orifice may be formed in any suitable manner. The inlet 7 is in the form of a tube having openings in its upper and lower sides and the passage of fluid through these openings is controlled by a balanced valve 11 having parts arranged to engage and close the respective openings. In this arrangement of the apparatus the valve has a stem 12 which is slidably mounted in a guide 13 formed in a cap 14 secured to the lower end of the casing 5. A portion of the stem is screw threaded, as shown at 15, and a nut 16 is mounted thereon. Confined between the nut 16 and the bottom of the cap 14 is a spring 17 which acts upon the valve to move the same toward its closed position.

Mounted on and spaced from the casing 5 is a second casing 18 having formed therein a chamber 19 which is connected by a tube 20 with the outlet conduit 9 at a point beyond the restricted orifice 10. Interposed between the two chambers is a movable device which is operatively connected with the valve 11 and which is subjected to the fluid pressures in the two chambers, the arrangement of the device being such that these pressures are opposed one to the other. As here shown, this movable device comprises two diaphragms connected one to the other for movement in unison. The lower diaphragm 21 is secured to the upper portion of the casing 5 and forms the top wall of the chamber 6. The upper diaphragm 22 is secured to the lower side of the casing 18 and forms the lower wall of the chamber 19. The central portions of the two diaphragms are connected one to the other by a rod 23. This movable device may be connected with the valve 11 in any suitable manner but, in the present instance, the valve has a stem 24 slidably mounted in a cross bar or guide 25 and arranged to be engaged by a part carried by the diaphragm 21, such as the lower end 26 of the rod 23. The valve stem 24 is held in contact with the end 26 of the rod by the spring 17 and the position of the valve is thus controlled by the position of the diaphragm.

A yieldable device acts upon the valve 11 to move the same toward its open position and this yieldable device preferably acts on the valve through the diaphragm 21. In the present construction the yieldable device comprises a weight and, as here shown, a lever 27 pivotally mounted at one end on a bracket 28 extends transversely to the structure as a whole and adjustably mounted on its other end is a weight 29. A link 30 is pivotally connected at one end with the lever 27 adjacent to the bracket 28 and is pivotally connected at its other end with a second lever 31 which is pivotally mounted on a fixed bracket 32 and is connected at a point between its ends with the rod 23. As here shown, the lever 31 comprises two parallel bars which are pivotally connected with the rod 23 by a pin 33.

It will be apparent, therefore, that the lower diaphragm 21 is subjected to the pressure of the water entering the chamber 6 through the inlet and the diaphragm 22 is subjected to the pressure of the water in the conduit 9. If the pressure in the chamber 6 increases with relation to the pressure in the conduit 9 the diaphragm 21 will be forced upwardly, against the action of the weight 29, thus causing the valve 11 to move toward its closed position and reducing the flow of water to the chamber 6. If the pressure in the conduit 9 increases with relation to the pressure in the chamber 6 this increased pressure will be transmitted to the upper diaphragm 22 and will, through the rod 23, be transmitted to the lower diaphragm 21 causing this lower diaphragm to move the valve toward its open position and thus admit a sufficiently increased amount of water to the chamber 6 to restore the predetermined difference between the pressures in the chamber 6 and the conduit 9. Assuming that the apparatus is so adjusted as to maintain a difference of ten pounds between the pressure in the chamber 6 and the pressure in the conduit 9 it will be apparent that any fluctuation of the pressures which would vary this fixed difference will be instantly compensated for by the varying pressures on the two diaphragms, which will result in repositioning the valve 11. In this manner the same difference in pressure will be maintained at all times regardless of the actual pressures and consequently a substantially uniform flow of water through the conduit will result.

That form of the device shown in Figs. 3 and 4 is substantially identical in its operation with the form shown in Figs. 1 and 2 but has been somewhat simplified in construction. As there shown, the structure which is interposed between the two parts of the conduit comprises a single casing 35 which is divided by a diaphragm 36 into a lower chamber 37 and an upper chamber 38. The lower chamber 37 has an inlet 39 to be connected with a source of supply for fluid under pressure, and also has an outlet 40 which is connected with a conduit 41. This conduit has a restricted orifice and, in the present instance, I have utilized as the restricted orifice an injector 42 which, in the water softening apparatus of the above mentioned application, is connected with a regenerating solution pipe 43 so that when the pipe 43 is open to permit the flow of solution to the injector this solution will be drawn into the conduit along with the water passing through the injector and thus delivered to the softener. The conduit 41 is connected at a point beyond the injector 42 with a tube 44 which leads to the upper chamber 38 of the casing 35. The passage of water through the inlet 39 is controlled by a valve 45 similar to that above described and this valve has a stem 46 which extends upwardly through a guide 47 and through the diaphragm 36 to which it is secured by a nut 48. A plate 49 secured to the lower side of the diaphragm has downwardly extending lugs 50 arranged to contact with the upper side of the inlet tube 39 to limit the downward movement of the diaphragm. Arranged in the upper chamber 38 is a coiled spring 51 which is confined between a plate 52 resting upon the diaphragm 56 and an adjustable stop or plate 53 arranged in the upper portion of the chamber. As here shown, this plate or stop 53 is acted upon by a screw 54 by means of which the tension of the spring 51 may be varied.

The operation of this form of the apparatus is substantially the same as that above described. The movable device which is interposed between the two chambers comprises a single diaphragm instead of two connected diaphragms and the pressure in the upper chamber is transmitted directly to the diaphragm instead of being transmitted thereto through connection with a second diaphragm.

While I have shown and described two embodiments of my invention I wish it to be understood that I do not desire to be limited to the details thereof as various modifications may occur to a person skilled in the art.

Having now fully described my invention, what I claim as new and desire to secure by Letters Patent, is:

1. In a device for regulating the flow of fluid, a structure comprising an upper chamber and a lower chamber having an inlet, a conduit leading from said lower chamber and having a restricted orifice, means for establishing a fluid connection between said upper chamber and said conduit at a point beyond said orifice, a balanced valve to control said inlet, a movable device interposed between said chamber, subjected to the fluid pressure in both chambers and operatively connected with said valve, and means tending to move said movable device in a direction to open said valve.

2. In a device for regulating the flow of fluid, a structure comprising an upper chamber and a lower chamber having an inlet arranged centrally thereof, a conduit leading from said lower chamber and having a restricted orifice, a passageway connecting said upper chamber with said conduit at a point beyond said orifice, a balanced valve to control said inlet, a movable device comprising flexible means for closing the lower side of said upper chamber and the upper side of said lower chamber, whereby the position of said movable means will be determined by the relative pressures in said chambers, an operative connection between said flexible means and said valve, and means tending to move said flexible means in a direction to open said valve.

3. In a device for regulating the flow of fluid, a casing, a diaphragm dividing said casing into upper and lower chambers, said lower chamber having an inlet arranged centrally thereof, a balanced valve to control said inlet, said valve having a stem connected with said diaphragm, a conduit leading from said lower chamber and having a restricted orifice, means connecting said upper chamber with said conduit at a point beyond said orifice, whereby said diaphragm will be subjected to the fluid pressures on the opposite sides of said restricted orifice, and a spring in said upper chamber acting on said diaphragm to move said valve toward its open position.

In testimony whereof, I affix my signature hereto.

EDWARD T. TURNER.